Dec. 5, 1967  H. W. PRUNER  3,355,910
FLEXIBLE COUPLING
Filed April 14, 1966

INVENTOR
HAROLD W. PRUNER
BY
Baldwin, Doran & Egan
ATTORNEYS

United States Patent Office 3,355,910
Patented Dec. 5, 1967

3,355,910
FLEXIBLE COUPLING
Harold W. Pruner, Mansfield, Ohio, assignor to Barnes Manufacturing Co., Mansfield, Ohio, a corporation of Ohio
Filed Apr. 14, 1966, Ser. No. 542,547
9 Claims. (Cl. 64—14)

ABSTRACT OF THE DISCLOSURE

A shaft coupling device for connecting a pair of substantially aligned shafts and compensating for misalignment therebetween including a pair of interfitting couplings and a semi-resilient, non-binding, synthetic, organic, plastic, intermediate member interposed between the couplings to permit fluid lubricant flow through the joints between the couplings and the intermediate members thereby lubricating the device and preventing frictional heat and excessive wear from developing therein. Each coupling includes a plurality of circumferentially spaced, elongated lugs extending axially inwardly of the device. The intermediate member includes openings in the outer surface thereof for receiving such lugs, said openings being bounded by interconnected side and end walls.

---

This invention relates to couplings, and more particularly to devices for connecting two shafts disposed in end-to-end relation and between which there may be slight lateral misalignment and/or a slight angularity between the axes of the shafts.

Many couplings have been devised for connecting shafts in a driven relationship, wherein the couplings compensate for angular misalignment and relative lateral displacement of the shafts and permit slight endwise movement of the shafts during their rotation. In such prior couplings, shaft misalignment and/or angular misalignment causes the coupling to quickly develop substantial frictional heat causing excessive wear which, in turn, results in premature failure of the coupling.

Therefore, it is an object of the invention to provide a shaft coupling wherein frictional heat and excessive wear are substantially eliminated.

A further object of the invention is to provide a shaft coupling constructed to provide fluid lubricant flow therethrough for cooling and lubricating the coupling.

A further object of the invention is to provide a shaft coupling that is simple in construction, inexpensive to manufacture, and highly effective in operation.

Briefly, the foregoing objects are accomplished by the provision of a flexible shaft coupling device for connecting two shafts disposed in end-to-end relation and including a pair of relatively rigid interfitting couplings and a semi-resilient elastomeric intermediate member interposed between the couplings. The intermediate member is not bonded to the couplings and is formed of a suitable elastomer such as non-porous polyurethane permitting fluid lubricant to flow through the joints between the couplings and the intermediate member (particularly when the shafts are misaligned) to lubricate the device and thereby prevent frictional heat and excessive wear from developing therein.

In operation, the coupling device is preferably used in connection with a fluid pump, such as a submersible pump, wherein the coupling device is disposed adjacent the pump impeller so that the fluid being pumped forms a fluid lubricant that flows through such coupling device to cool and lubricate the same.

Other objects and advantages of the invention will be apparent from the following description taken in conjunction with the drawings wherein:

FIGURE 3 is a front elevational sectional view of the coupling device of the invention applied to a submersible pump;

Figure 8:
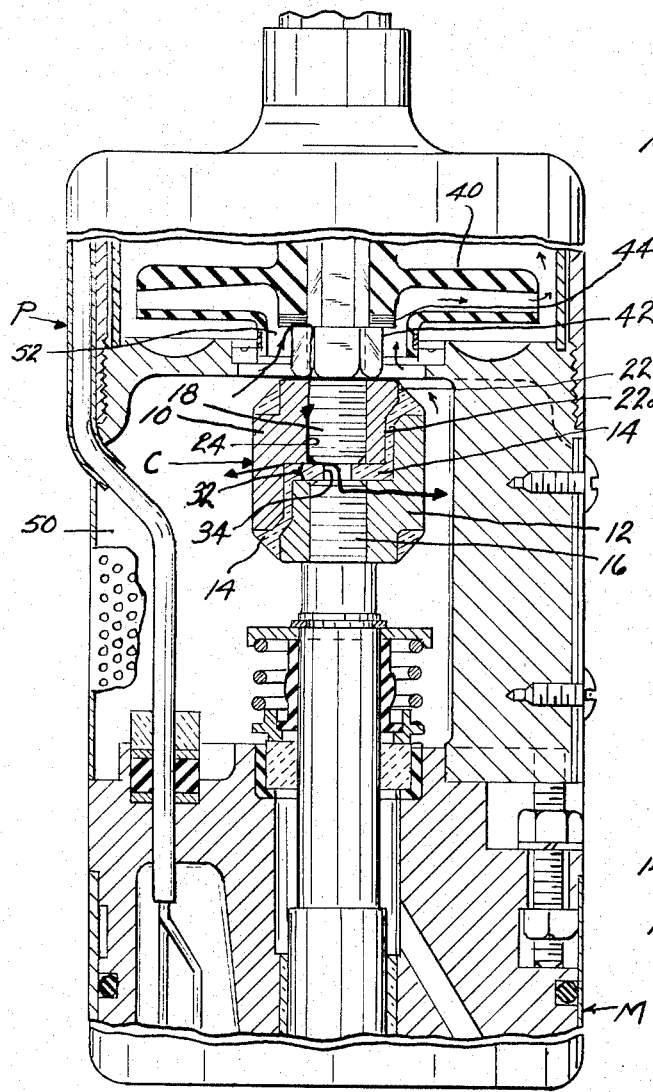
Figure 4:
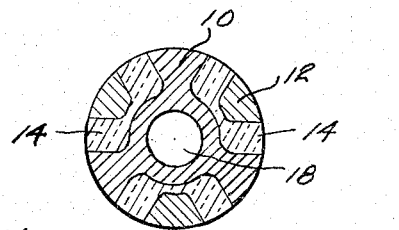
FIGURE 4 is a view taken along the line 4—4 of FIG. 1.
Figure 1:
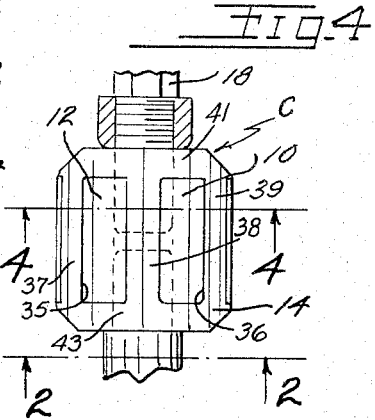
FIGURE 1 is a front elevational view, partly in section, of a coupling device constructed in accordance with the invention.
Figure 2:
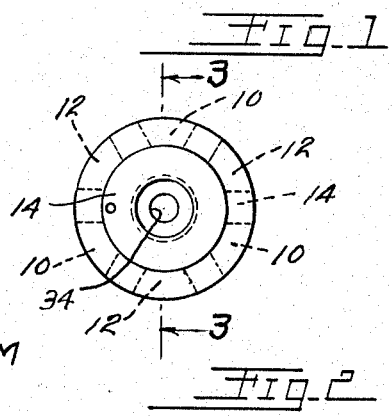
FIGURE 2 is a view taken along the line 2—2 of FIG. 1.

Although the invention is shown and described herein with reference to its use in submersible pumps, it will be understood that it may be used in any application wherein a driving shaft and a driven shaft are to be connected.

Referring to the drawings, there is shown a coupling device of the invention, generally designated as C, and including a pair of relatively rigid axial interfitting inserts or couplings 10 and 12, and a semi-resilient interfitting intermediate member 14 interposed between and inwardly of the couplings. In the application shown, the coupling device C connects a motor shaft 16 with a submersible pump impeller shaft 18. Since the couplings 10 and 12 are substantially identical in construction, only one will be described in detail.

Figure 5:
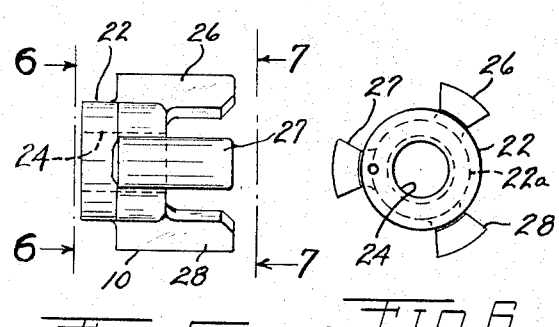
FIGURE 5 is a side elevational view of one of the couplings of the coupling device shown in FIG. 1.
Figure 6:
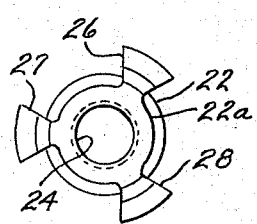
FIGURE 6 is a view taken along the line 6—6 of FIG. 5.
Figure 7:
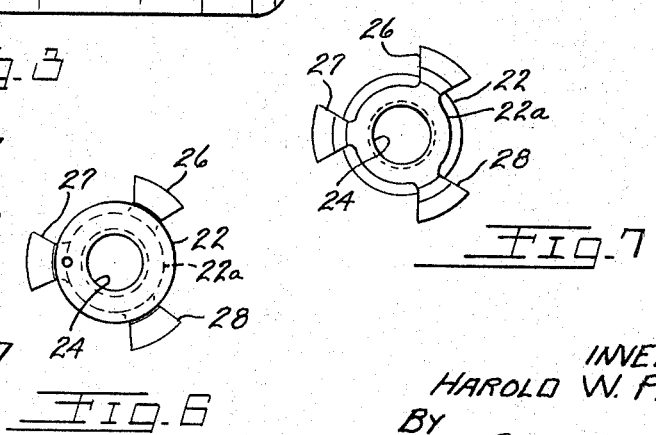
FIGURE 7 is a view taken along the line 7—7 of FIG. 5.

The coupling 10 includes a hub 22 (FIGURES 5, 6 and 7) having a restricted portion 22a. Such hub and its restricted portion have an open-ended longitudinal threaded bore 24 for axially receiving the threaded end of an associated shaft such as, for example, the impeller shaft 18. Formed on the outer longitudinal surface of the restricted hub portion 22a are a plurality of circumferentially spaced elongated lugs 26, 27 and 28, which extend inwardly of the coupling and loosely interfit with like lugs on the opposite coupling 12. In one of the preferred forms of the invention, the couplings 10 and 12 are formed of an aluminum-bronze alloy. However, the metals or even non-metal materials may be used.

As aforementioned, the lugs of one coupling loosely interfit with the lugs of the other coupling to provide spaces therebetween. The intermediate member 14 is disposed in such spaces and in the space 32 between the two interfitting couplings (but is not bonded to the couplings) and substantially covers the outer longitudinal surfaces of each of the hubs. Thus, the intermediate member contains a plurality of openings 35, 36, for example, in the outer surface thereof, with the lugs being disposed in such openings; said openings being bounded by interconnected side walls 37, 38, 39, and end walls 41, 43, respectively, all forming the intermediate member. The intermediate member 14 has a centrally disposed longitudinal aperture 34, the purpose for which will be hereinafter described.

Preferably, the intermediate member is formed of a non-bonding synthetic organic plastic such as, for example, a non-porous polyurethane elastomer. One typical type of polyurethane elastomer which may be used is described in United States Patent No. 3,214,411 issued October 26, 1965 to James H. Saunders and Kenneth A. Pigott. Thus, the aluminum-bronze inserts 10 and 12 are permanently molded in place with a suitable elastomer in the non-bonded state. The driving lugs of the inserts provide rectangular driving sections of the elastomeric intermediate member, thus creating self-retaining forces on such member. In practice, the coupling device C may be used, for example, to connect the respective shafts of a submersible pump P having an impeller 40, and an electric motor M, such pump and motor not being further described in detail as the same, per se, form no part of the invention.

As aforementioned, the elastomeric intermediate member 14 is not bonded to the couplings 10 and 12. This permits the joints between the intermediate member and the couplings to part or open up slightly (particularly when misalignment of the shafts 16 and 18 occurs) to permit fluid lubricant (such as the water being pumped by the pump P) to flow through said joints to lubricate and cool the coupling device C. Additionally, the shafts 16 and 18 are threadedly disposed in their respective coupling bores with a fit permitting such fluid lubricant to pass therethrough. Likewise, the impeller nut 42 and the shims 44 are constructed to permit slight passage of water thereby, as will now be described.

In operation, the coupling device C is disposed adjacent the impeller 40 which draws water through the inlet 50 (FIG. 3), thence through the passageway 52 and upwardly past the impeller 40. For lubrication purposes, the water flows past the shims 44, thence between the nut 42 and the shaft 18, thence between the shaft 18 and the longitudinal wall of the coupling bore 24. From this point, the water flows in the first instance, through the joints between the intermediate member 14 and the coupling 10, and, in the second instance, through the intermediate member aperture 34, and thence through the joints between the intermediate member and the coupling 12.

With this structure, the coupling device is continually cooled and lubricated thereby preventing frictional heat and excessive wear from developing therein. The lugs on the hubs 10 and 12 are thus exposed to the water being pumped to provide rapid heat transfer and to act as a centrifugal pump to provide a continuous minute flow of water between the joints as aforedescribed. Additionally, the coupling C substantially dampens vibration between the pump and motor resulting in longer pump and bearing life. Also, the invention relieves stresses on the motor and pump shafts caused from misalignment, thus protecting against shaft breakage.

The terms and expressions which have been employed are used as terms of description, and not of limitation, and there is no intention, in the use of such terms and expressions, of excluding any equivalents of the features shown or described, or portions thereof, but it is recognized that various modifications are possible within the scope of the invention claimed.

What is claimed is:

1. A flexible shaft coupling device for connecting a pair of substantially aligned shafts and compensating for misalignment between the shafts comprising, a pair of relatively rigid axially interfitting couplings, and an interfitting intermediate member interposed between and inwardly of the couplings and formed of a non-bonding semi-resilient material permitting flow of fluid lubricant through the joints between such intermediate member and the couplings, said intermediate member having a longitudinal aperture in communication with said joints, each of said couplings having a longitudinal open-ended bore in communication with said aperture for axially receiving an associated shaft in the outer end thereof with a fit permitting fluid lubricant to flow therethrough and to and through the aperture and through said joints to lubricate the same to substantially prevent frictional heat and excessive wear from developing in the device, each of said couplings including a hub having a plurality of circumferentially spaced elongated lugs extending axially inwardly from the hub whereby the lugs of one coupling loosely interfit with the lugs of the other coupling to provide spaces between such interfitting lugs and between said hubs, and said intermediate member being disposed in said spaces and substantially covering the outer longitudinal surfaces of each of said hubs whereby said intermediate member forms openings in the outer surface thereof with said lugs being disposed in said openings, said openings being bounded by interconnected side and end walls of the intermediate member.

2. The structure of claim 1 wherein said lugs on each of said hubs are secured to the outer longitudinal surface of the hub.

3. The structure of claim 1 wherein each of said hubs has an inner restricted portion of lesser diameter than the outer portion thereof, and said lugs are secured to the outer longitudinal surface of said restricted portion.

4. The structure of claim 1 wherein said bore is threaded for receiving a threaded end of the associated shaft with a fit permitting fluid lubricant to flow therethrough.

5. The structure of claim 4 wherein said device is used to connect the motor shaft and the impeller shaft on an associated submersible pump, and said device is disposed adjacent such impeller to receive fluid lubricant therefrom and thence through said bore to lubricate the device.

6. The structure of claim 1 wherein said couplings are formed of an aluminum-bronze alloy.

7. The structure of claim 1 wherein said intermediate member is formed of a non-bonding synthetic organic plastic.

8. The structure of claim 7 wherein said synthetic organic plastic is a non-porous polyurethane elastomer.

9. The structure of claim 1 wherein, each of said couplings is formed of an aluminum-bronze alloy and each coupling includes a hub having an inner restricted portion of lesser diameter than the outer portion thereof, said restricted portion of the hub having a plurality of circumferentially spaced lugs secured to the outer longitudinal surface of the restricted portion and extending axially inwardly from the hub whereby the lugs of one coupling loosely interfit with the lugs of the other coupling to provide spaces between such interfitting lugs and between said hubs, said intermediate member being formed of a non-porous polyurethane elastomer and is disposed in said spaces and substantially covers the outer longitudinal surfaces of each of said hubs, said bore being threaded for receiving a threaded end of the associated shaft with a fit permitting fluid lubricant to flow therethrough, said coupling device being used to connect the motor shaft and the impeller shaft on an associated submersible pump, and said device being disposed adjacent such impeller to receive fluid lubricant through said bore and through said joints to lubricate the coupling device.

References Cited

UNITED STATES PATENTS

| | | | |
|---|---|---|---|
| 2,125,270 | 8/1938 | Conover | 64—30 |
| 2,655,798 | 10/1953 | Neher | 64—14 |
| 2,891,395 | 6/1959 | Chater | 64—14 |
| 2,902,842 | 9/1959 | Byrom | 64—14 |
| 2,943,464 | 7/1960 | Voges | 64—14 |
| 3,230,739 | 1/1966 | Stewart | 64—28 |

HALL C. COE, *Primary Examiner.*